United States Patent [19]

Tanemoto et al.

[11] Patent Number: 5,066,617

[45] Date of Patent: Nov. 19, 1991

[54] METHOD FOR PRODUCING PLZT POWDER

[75] Inventors: Kei Tanemoto; Akiro Ando; Hiroshi Kubo, all of Kawasaki, Japan

[73] Assignee: Nippon Steel Corporation, Tokyo, Japan

[21] Appl. No.: 351,277

[22] Filed: May 8, 1989

Related U.S. Application Data

[63] Continuation of Ser. No. 74,064, Jul. 16, 1987, abandoned.

[30] Foreign Application Priority Data

Jul. 23, 1986 [JP]  Japan ................................. 61-171830

[51] Int. Cl.$^5$ .............................................. C04B 35/49
[52] U.S. Cl. .................................... 501/134; 252/62.9; 423/598
[58] Field of Search ............... 501/136, 134; 252/62.7; 423/598, 619

[56] References Cited

U.S. PATENT DOCUMENTS

| | | | |
|---|---|---|---|
| 3,528,919 | 9/1970 | McNamara et al. | 423/598 X |
| 3,699,044 | 10/1972 | Dosch et al. | 252/62.9 |
| 4,643,984 | 2/1987 | Abe et al. | 501/136 X |
| 4,696,810 | 9/1987 | Shirasaki et al. | 423/598 X |
| 4,820,669 | 4/1989 | Kato et al. | 501/134 |

FOREIGN PATENT DOCUMENTS

| | | | |
|---|---|---|---|
| 3614437 | 10/1986 | Fed. Rep. of Germany . | |
| 2568239 | 1/1986 | France . | |
| 0246222 | 12/1985 | Japan . | |
| 61-053115 | 3/1986 | Japan | 1/2 |
| 61-106456 | 5/1986 | Japan | 35/49 |
| 61-106457 | 5/1986 | Japan . | |
| 60-180959 | 5/1986 | Japan | 35/49 |
| 0924014 | 5/1982 | U.S.S.R. | 423/598 |
| 2163142 | 2/1986 | United Kingdom . | |

OTHER PUBLICATIONS

Recent Improvements in the Optical and Electrooptic Properties of PLZT Ceramics, 3 *Ferroelectrics* pp. 269-290 (1972) and Haertling et al.

Hot-Pressed (Pb, La) (Zr, Ti)O$_3$ Ferroelectric Ceramics For Electrooptic Applications, 54 *Journal of the American Ceramic Society* 1 (Jan. 1971).

Chemical Abstract, JP-A-62-3005, vol. 11, No. 176, Sep. 1, 1987.

Chemical Abstract, JP-A-61-247607, vol. 1, No. 96, Apr. 11, 1985.

*Primary Examiner*—Karl Group
*Attorney, Agent, or Firm*—Cushman, Darby & Cushman

[57] ABSTRACT

In a method for producing PLZT powder, the A-site components are co-precipitated simultaneously and mixed with the B-site components which are also co-precipitated simultaneously. As a result, the powder obtained by calcination of the precipitates has less fluctuation in the chemical composition compared with the prior art.

13 Claims, 1 Drawing Sheet

METHOD FOR PRODUCING PLZT POWDER

This is a continuation of application No. 07/074,064, filed July 16, 1987 now abandoned.

BACKGROUND OF THE INVENTION

1. Field of the Invention

The present invention relates to a method for producing transparent PLZT ceramics, which have a uniform composition and a high light-transmittance. More particularly, the present invention relates to a method for producing a calcined PLZT powder which can yield the transparent PLZT ceramics mentioned above. Transparent PLZT ceramics are intended for use in the field of opto-electronics as the materials for an optical shutter, an optical valve, an optical switch, an image discharge-storage device, an optical modulation component, and the like, by utilizing the electro-optic effect, electro-optic scattering effect, piezoelectric effect, and the like of these ceramics.

2. Description of the Related Arts

The transparent PLZT ceramics are produced by preparing the powder, pressing the powder to form a green compact, and hot-pressing the green compact in air or an oxygen atmosphere, or sintering the green compact under a normal pressure and in a mixed atmosphere of oxygen gas and PbO vapor.

In the case of sintering, an excessive amount of PbO is frequently included in the green compact, to generate a liquid phase therein and thus promote the densification thereof.

To obtain a PLZT sintered body having a chemically high uniformity and a high light transmittance, it is important that the PLZT powder have a uniformity in shape and chemical composition, and that the powder can be easily sintered. A sintered body having a nonuniform chemical composition is optically non-uniform, with the result that light transmittance and electro-optic coefficient vary greatly and cause serious problems when in practical use. In addition to produce the PLZT ceramics at a low cost, inexpensive starting materials must be used, and the process must be simple and have a high workability.

As previous methods for producing the starting material of transparent PLZT ceramics, there are the dry method, the alkoxide-coprecipitation method, the oxalate method in ethanol solution, and the multi-stage coprecipitation method. The dry method, for example, is described in Journal of the American Ceramic Society, Vol. 54, No. 1, page 1-11 (1971). The alkoxide-coprecipitation method, for example, is described in Ferroelectrics, Vol. 3, page 269-280 (1972). The oxalate method in ethanol solution is described in Japanese Unexamined Patent Publication No. 60-180959. The multi-stage coprecipitation method is described in Japanese Patent Application No. 59-228760, corresponding to Japanese Unexamined Patent Publication No. 61-106457 entitled, A Method for Producing PLZT Light-Transmitting Ceramics.

In the dry method, the constituent compounds are mixed and then calcined, but it is difficult to ensure a uniform mixing of the four constituent compounds in the dry method, and thus the resultant calcined powder is liable to have a nonuniform chemical composition. In addition, since the calcination is carried out at a high temperature to provide a uniform composition, the particles sinter together due to the neck formation, and this leads to the formation of coarse particles. As a result, it is also difficult to obtain a starting material which can be easily sintered.

In the alkoxide-coprecipitation method, the lead oxide powder, zirconium alkoxide solution, titanium alkoxide solution, and lanthanum acetate solution, for example, are mixed, coprecipitated, dried, calcined, and then grinded. According to this method, the obtained powder has a uniform composition and is easily-sintered, but because of the high cost of the alkoxide and acetate used in this method, an inexpensive PLZT powder cannot be obtained.

In the oxalate method in ethanol solution, ethanol is added to the aqueous mixed solution containing nitrates of lead, lanthanum, zirconium, and titanium, and an ethanol solution in which oxalic acid has been dissolved is dropped into the aqueous mixed solution, to precipitate the oxalates of the respective components. These coprecipitates are thermally decomposed, calcined, and then grinded. The PLZT powder obtained by this method is fine and is easily-sintered, but the cost is high because of a large amount of ethanol and oxalic acid must be used, which is comparatively expensive.

The development of the alkoxide-coprecipitation method and the oxalate method in ethanol solution lies in the provision of methods in which titanium tetrachloride is not used, as when titanium tetrachloride is used in a precipitation method, the chlorine therein reacts with lead to yield a white precipitate of lead chloride, with the result that the desired co-precipitation is not realized. Therefore, the above two methods, in which titanium tetrachloride is not used, were devised.

In the multi-stage coprecipitation method as disclosed in Japanese Unexamined Patent Publication No. 61-106,457 it is possible to use titanium tetrachloride as the titanium source, as follows. Four aqueous solutions each containing one of the components, i.e., lead, lanthanum, zirconium, and titanium, are prepared, and then the lanthanum aqueous solution and the zirconium aqueous solution are mixed with either the lead aqueous solution or the titanium aqueous solution, thereby obtaining two kinds of aqueous solutions. One of these aqueous solutions is mixed with a liquid precipitant in an excess amount to form the precipitates. Subsequently, the remaining aqueous solution is uniformly mixed with the aqueous solution containing the dispersed precipitates, thereby forming homogeneous precipitates of all of the components. The precipitates are then dried calcined, formed, and sintered. This method is advantageous in that titanium tetrachloride, which cannot be used in the conventional co-precipitation method, can be used as the titanium source, and in addition, since the precipitation is carried out in two stages, the kind and concentration of the precipitant-liquid can be selected while ensuring that they are appropriate to the composition of precipitates to be formed at the respective stages. Accordingly, the secondary particles do not grow, the sintering is easy.

When the PLZT is used as an optically functional material, the chemical composition of a sintered body must be microscopically uniform. To provide such a microscopically uniform chemical composition, the chemical composition of the PLZT powder must be uniform, that is, in the PLZT, which is expressed by $ABO_3$ of perovskite, the quantity ratio of Pb and La of the A-site constituent elements, as well as the quantity ratio of Zr and Ti of the B-site constituent elements must be uniform in all particles of the powder, and must have particular values.

The conventional, powder-synthetizing methods are now evaluated from the viewpoints of a necessity for the composition to be uniform, and the powder to be inexpensively produced by a simple process. First, the process of the dry method is simple but raw materials having a high purity must be used. In addition, since the mixing method by, for example, a ball mill, is limited with regard to a uniform mixing, the composition of the obtained powder has a poor uniformity. Second, in the wet methods, such as the alkoxide-coprecipitation method and the oxalate method in ethanol solution, it is easy to obtain a powder having a uniform composition, but expensive raw materials must be used, the production process is complicated, and the workability is poor. Third, in the multi-stage coprecipitation method, the fine particles are obtained by using inexpensive raw materials, such as titanium tetrachloride, but it is difficult to obtain a powder having a uniform composition.

SUMMARY OF THE INVENTION

Therefore, the present invention provides a method for producing the PLZT powder, in which method the production process is simple, a uniform composition is attained, the sintering is easy, and inexpensive raw materials such as titanium tetrachloride can be used.

In accordance with the present invention, there is provided a method for producing a PLZT powder comprising the steps of: preparing a first aqueous solution containing two components, lead and lanthanum, mixed therein; preparing a second aqueous solution containing two components, zirconium and titanium, mixed therein; forming homogeneous precipitates of the components in the first and second aqueous solutions by (1) dropping the first and second aqueous solutions into a liquid body of a common precipitant, simultaneously and synchronously, while stirring the liquid body, or, (2) dropping the first and second aqueous solutions into separate liquid bodies of precipitants, while stirring the liquid bodies of precipitants, thereby forming the precipitates from the first and second aqueous solutions, respectively (hereinafter referred to as the first and second precipitates), and, then, mixing the first and second precipitates as well as the liquid bodies of precipitants; and, calcining the homogeneous precipitates.

The calcined precipitates obtained as above are the starting material for forming transparent PLZT ceramics. The starting material may be treated by a known one process. For example, the calcined powder is formed and is hot-pressed at a temperature of from 1000° to 1300° C. in air or an oxygen atmosphere, or the compacted powder is sintered at a temperature of from 1000° to 1300° C. under a normal pressure in an atmosphere containing a mixture of oxygen and PbO vapor.

DESCRIPTION OF THE PREFERRED EMBODIMENTS

Figure 1:
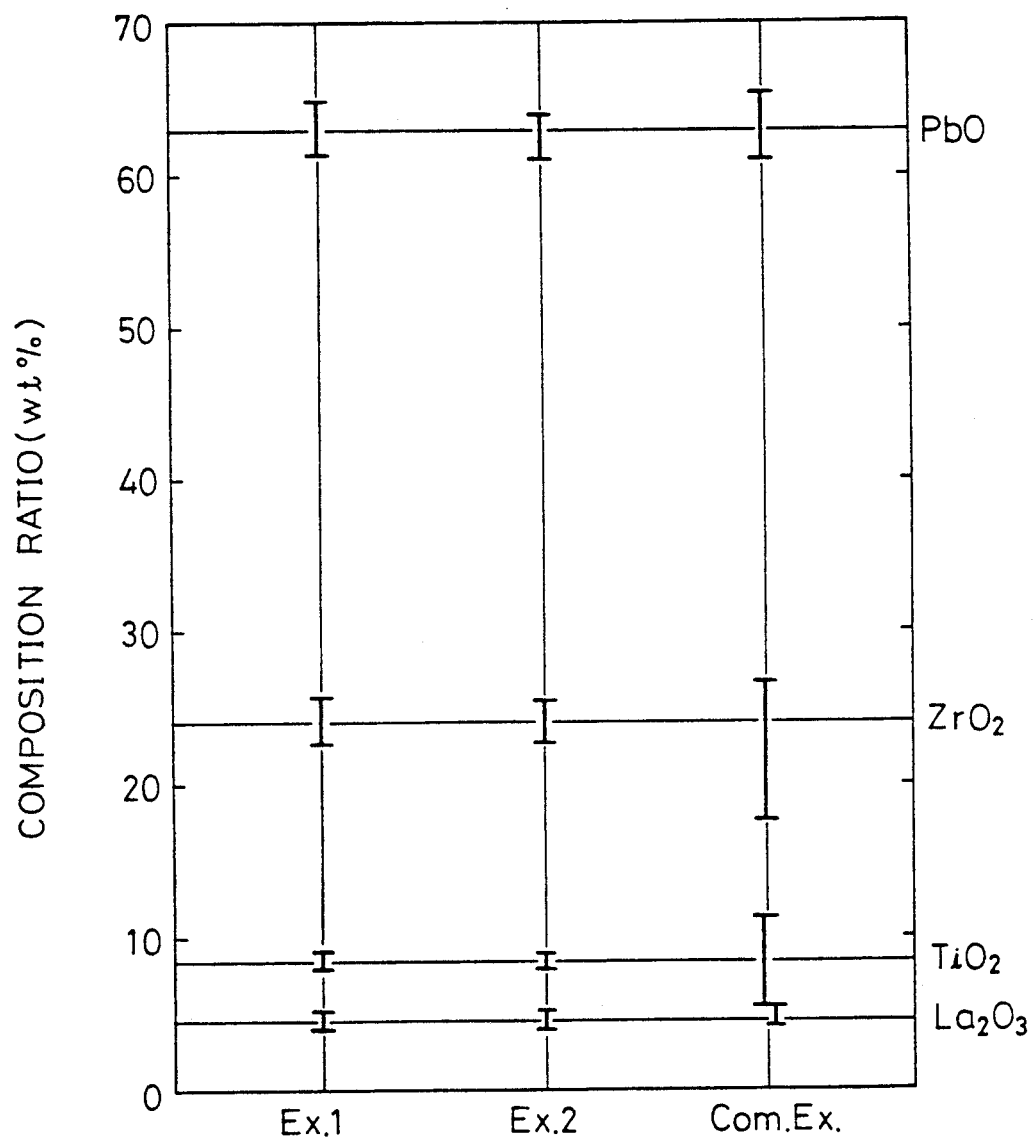
FIG. 1 is a graph showing the fluctuation in the composition of PbO, $ZrO_2$, $TiO_2$, and $La_2O_3$, i.e., the constituent oxides, of the calcined PLZT powders having the perovskite single phase obtained by the inventive method and multi-stage coprecipitation method. The ordinate indicates the composition ratio in weight %, and the abscissa indicates the inventive Example 1 by "Ex. 1", the inventive Example 2 by "Ex. 2", and the comparative example of the multi-stage coprecipitation method by "Com. Ex.".

According to the present invention, the first aqueous solution containing A-site constituent components (Pb and La) and the second aqueous solution containing B-site constituent components (Zr and Ti) are dropped, independently from one another, into the liquid body or bodies of precipitant, without mixing the first and second aqueous solutions and, therefore, the concentration ratio of Pb and La and the concentration of Zr and Ti are uniform in the first and second precipitates, respectively, and further, inexpensive raw materials such as titanium tetrachloride can be used.

When the A-site constituent components (Pb, La) and B-site constituent components (Zr, Ti) are subjected to a simultaneous and concurrent precipitation and the obtained first and second precipitates are continuously mixed, according to one aspect of the present invention, the first and second precipitates are finely and uniformly mixed to yield precipitates consisting of the four components.

In addition, when the first aqueous solution containing A-site components (Pb and La) and the second aqueous solution containing B-site components (Zr and Ti) are dropped into the respective liquid bodies of precipitants to form the first and second precipitates, and the precipitates and liquid bodies of precipitants as a whole are then mixed in accordance with another aspect of the present invention, homogeneous precipitates, in which the entire four components are finely and uniformly mixed are obtained.

The multi-stage coprecipitation method, which can be embodied as shown by the following four cases, cannot attain such a uniformity in the composition. ①the lanthanum aqueous solution, zirconium aqueous solution, and lead aqueous solution are mixed to form a mixed solution, and a liquid precipitant in an excess amount is added to the mixed solution to yield the precipitates. The titanium aqueous solution is then uniformly mixed with the aqueous solution in which these precipitates are dispersed, to form the precipitates of all of the components. ②the precipitates-formation process in 1 is reversed, i.e., the titanium-precipitates are formed first. ③the lanthanum aqueous solution, zirconium aqueous solution, and titanium aqueous solution are mixed to form a mixed solution, and a liquid precipitant in an excess amount is added to the mixed solution to yield the precipitates. The lead aqueous solution is then uniformly mixed with the aqueous solution in which these precipitates are dispersed, to form the precipitates of all of the components. ④the precipitates-formation process in ③is reversed, i.e., the lead-precipitates are formed first.

In the methods ①and ② since the Pb and La components are simultaneously precipitated, a fine and uniform mixing of the Pb and La components is easily attainable. But since the Zr and Ti components are precipitated in separate stages, a fine and uniform mixing of the Zr and Ti components is difficult to realize, with the result that the Zr/Ti-ratio in the B site is liable to be fluctuated.

In the methods ③and ④ since the Zr and Ti components are simultaneously precipitated, a fine and uniform mixing of the Zr and Ti components is easily attainable. But since the Pb and La components are precipitated in separate stages, a fine and uniform mixing of the Pb and La components is difficult to realize, with the result that the Pb/La-ratio in the A site is liable to be fluctuated.

Since the A-site constituent components and the B-site constituent components are precipitated independently from one another, and further, the four components are co-precipitated in the liquid body of precipitant according to the present invention, the composition can be strictly controlled and the PLZT having an excellent uniformity can be produced, compared with the multi-stage coprecipitation method in which the Pb and Ti components are consecutively precipitated in separate stages.

In the method according to the present invention, the first aqueous solutions, in which the two components, i.e., lead and lanthanum A site-constituent elements of perovskite oxide PLZT are mixed, and the second aqueous solution, in which the two components, i.e., zirconium and titanium B-site constituent elements of perovskite oxide PLZT, are prepared. The sulfate, nitrate, oxynitrate, acetate, chloride, oxychloride, and oxide of the four components can be used as the compounds for preparing the aqueous solutions. In addition, the four components in metallic form also can be used for the preparation of aqueous solutions. It is not necessary for these raw materials to have a particularly high purity, and commercially available guaranteed reagents and their equivalent can be used for the raw materials. Note, when the concentration of the aqueous solutions is too high, the solution which is dropped at the precipitates-formation lowers the pH of the environmental liquid around the dropped parts, with the result that a stable formation of precipitates is impeded, particularly for the lead component. On the other hand, when the concentration of the aqueous solutions is too low, the time required for forming the required precipitates is increased and the efficiency of the process is impaired. Any raw material insoluble in water may be added to acid to make it soluble.

According to one aspect of the present invention, the first and second aqueous solutions are dropped into an identical liquid body of precipitant, in such a manner that the dropped parts of the liquid body are spaced for enough apart to ensure that there will be no contact between the first and second precipitates and no contact between the dropped first and second unreacted aqueous solutions; and, the dropping is simultaneous and synchronous. The term synchronous dropping as used herein indicates that the dropping-initiation of the first and second aqueous solutions takes place virtually simultaneously, and the dropping completion of the first and second aqueous solutions occurs virtually simultaneously. Preferably, to attain a good mixing and dispersing of the precipitates formed, the dropping is continued while stirring the liquid body of precipitant. Also, preferably the stirring is continued for a while even after the completion of precipitation.

According to another aspect of the present invention, the first and second, aqueous solutions are dropped into the separate liquid bodies of precipitant, thereby forming the first and second precipitates, and these precipitates are mixed with one another while the entire liquid bodies, including the precipitates, are stirred and fully mixed with one another.

The liquid precipitant is appropriately selected from, for example, inorganic compounds such as ammonia, ammonium carbonate, caustic alkali, sodium carbonate, oxalic acid, ammonium oxalate, and the like, and organic compounds such as amine and oxyne. Preferably, the liquid precipitant is free of alkali metal, since it may impair the sintering characteristics and physical properties of the ceramics. Most preferably, ammonia is used, since it is inexpensive and easily removed by rinsing.

The obtained precipitates are repeatedly filtered and rinsed with water, several times, to remove the ammonia component, various ion groups and radicals attached thereto. If the filtering and rinsing are not properly carried out, the reactions in a subsequent calcining process and the densification in the sintering process are impeded by the remaining ammonium and the like.

The filtered and rinsed precipitates are in the form of a agglomerated powder, but are fine particles having a primary particle diameter of approximately 100 Å. The precipitates-powder is then dried at a temperature of from 90° to 110° C. for 10 to 20 hours in a drier. Subsequently, the powder is grinded in a mortar for approximately 20 to 60 minutes by a dry method, and preferably, by a wet method using acetone or the like, to relieve the connection between the particles.

Subsequently, calcination is carried out. When the calcining temperature is too low, the formation reactions of PLZT perovskite and the degassing will be incomplete. On the other hand, when the calcining temperature is too high, the particles of the powder become coarse, and thus impair the shapeability and sintering characteristic. The calcining temperature is preferably from 500 to 1000° C., more preferably from 600° to 750° C. The powder calcined at a temperature of from 600° to 750° C. is not coarse and can be easily finely divided into fine particles having a diameter of primary grains ranging from 0.05 to 0.1 $\mu$m, by a conventional grinding method, e.g., with an alumina-ball mill.

The calcination at a temperature of from 600° to 750° C. allows a single phase of perovskite to be formed and variations in the composition of the calcined powder, in terms of percent based on the weight of PLZT, within the range of PbO±1.7%, $La_2O_3$±0.7%, $ZrO_2$±1.6%, and $TiO_2$±0.7%, preferably within the range of PbO±1.5%, $La_2O_3$±0.6%, $ZrO_2$±1.4% and $TiO_2$±0.5%.

The sintering process is carried out by employing previously known, methods and conditions, for example, as follows. A liquid-phase sintering may be carried out to promote the densification of sintered articles. This can be achieved by adding PbO powder to the calcined PLZT powder in an amount in terms of Pb of 10% by weight or less in excess of the Pb content of the requisite PLZT composition. An excess amount of PbO will prevent the unpreferable lack of Pb component caused by PbO vaporization during sintering. When the excess amount of PbO exceeds 10% by weight, a part of the PbO remains in the sintered body and impairs the optical properties thereof. After adding PbO, the powder is thoroughly mixed by a wet method in a ball mill to realize a good mixing and fine division. If the mixing in the ball mill is unsatisfactory, the added PbO particles segregate and thus a uniform sintering is impeded.

Subsequently, the forming and sintering are carried out. The forming is carried out under a pressure of from 500 to 1000 kgf/cm$^2$ by a uniaxial die-forming, or after the uniaxial forming, the cold isostatic pressing (CIP) is carried out at a pressure of from 1 to 2 tons/cm$^2$. The hot-pressing in air is less expensive than that in an oxygen atmosphere, but the sintering in an oxygen atmosphere is reliable from the viewpoint of the sintering characteristic.

As for the atmospheric sintering, some lead-containing perovskite compounds such as $PbZrO_3$, PbO, and the like as well as the green body (sintering article) may be filled in a container, which is permeable to oxygen, and then sintered. In this case, the vaporization of the Pb component from the green body can be suppressed, to enhance the density. In the above sintering within PbO vapor and oxygen atmosphere, a sufficient amount of the Pb component-containing powder must be present around the green body to generate PbO vapor, and fresh oxygen gas must be constantly supplied to the green body during sintering.

The sintering temperature may be from 1000° to 1300° C., preferably from 1150° to 1250° C. When the sintering temperature is too low, an incomplete sintering will occur. On the other hand, when the sintering temperature is too high, the vaporization of Pb component becomes noticeable and the porosity of the sintered body becomes disadvantageously high.

The present invention is characterized by the precipitation of the A site-constituent components and the B site-constituent components of perovskite PLZT independently from one another, and the subsequent uniform mixing of these precipitates in the liquid body or bodies of precipitant, thereby forming the homogeneous precipitates of all of the four components. These precipitates are featured by a fine particle-size of approximately 100 Å, a microscopically uniform chemical composition, and a uniform mixture of the A and B sites-constituent components. The present invention is also characterized by a relatively low calcining temperature at which the chemical reactions and reactions for forming a solid solution can be attained, while avoiding a coarse growth of particles. The calcined powder has the requisite composition and exhibits virtually no compositional fluctuation in the contents of A and B-sites constituent components. Also the calcined powder is easily sintered, since it has a high surface-activity and is fine.

When the PLZT powder obtained by the method of present invention is used for producing a sintered body, it is very easy to produce optically functional parts which are microscopically uniform.

The method according to the present invention is advantageous in that it is carried out by a simple process, has a high workability, and uses inexpensive raw materials, such as titanium tetrachloride, in the aqueous solution. The present invention will be described by the use of examples, which in no way limit the scope of the invention.

EXAMPLE 1

An aqueous solution containing 12.430 g of lead nitrate and 1.206 g of lanthanum nitrate, and a second aqueous solution containing 6.060 g of zirconium oxynitrate and 2.677 g of titanium tetrachloride were prepared, each to the amount of 100 cc. Commercially available guaranteed reagents were used. The first and second aqueous solutions were simultaneously dropped, for 1 hour, into one liter of a 14N-aqueous ammonia solution, while stirring the solution, in such a manner that no reactions occurred between the both aqueous solutions, with the result that the homogeneous precipitates of respective hydroxides of lead, lanthanum, zirconium, and titanium were obtained, and subsequently, the precipitates were stirred for approximately 1 hour. The precipitates were then repeatedly filtered and rinsed with water to remove the ions of ammonia, nitric acid, chlorine, followed by drying and grinding. Calcination was then carried out at 700° C. for 3 hours to obtain a PLZT powder having the composition $(Pb_{0.91} La_{0.09})(Zr_{0.65} Ti_{0.35})_{0.9775}O_3$. The calcined powder was grinded in an agate mortar and then subjected to a crystallographic analysis by X-ray diffraction. The powder was revealed to be perovskite single phase. In addition, observation by a transmission electron microscope of the powder revealed that the average particle diameter was approximately 0.1 μm and the particles were uniform.

PbO powder was added to the above mentioned calcined powder in an amount sufficient to provide an 8% by weight amount of excess Pb component. The PbO powder and calcined powder were mixed and ground in a pot made of polyethylene and steel balls coated with polyamide, for 18 hours. In order to remove impurities with which the powder was contaminated by the ball mill, a heat treatment was carried out at 550° C. for 3 hours, followed by finely dividing the powder in an agate mortar. The obtained powder was uni-axially shaped into a disc 20 mm in diameter and approximately 2 mm thick under a pressure of 1 ton/cm$^2$, and then sintered at 1200° C. for 30 hours in a mixed atmosphere of oxygen gas and PbO vapor under a normal pressure. The obtained sintered body exhibited an approximately 70% transmittance of light having a wavelength of 6328 Å. That is, the obtained PLZT ceramics had a light transmittance value which was virtually equal to the theoretical value.

EXAMPLE 2

A first aqueous solution containing 37.290 g of lead nitrate and 3.618 g of lanthanum nitrate, and a second aqueous solution containing 18.180 g of zirconium oxynitrate and 8.031 g of titanium tetrachloride were prepared, each to the amount of 300 cc. Commercially available guaranteed reagents were used. The first and second aqueous solutions were dropped, for 1 hour, into one liter separate bodies of 7N-aqueous ammonia solution, while stirring the bodies.

A suspension liquid of homogeneous precipitates of hydroxide of lead and lanthanum, and a suspension liquid of homogeneous precipitates of hydroxide of zirconium and titanium were obtained. The two suspension liquids were mixed with one another and stirred for approximately 1 hour, and then the water rinsing and drying were carried out as in Example 1.

Calcination was then carried out at 700° C. for 3 hours to obtain a PLZT powder having the composition $(Pb_{0.91} La_{0.09})(Zr_{0.65} Ti_{0.35})_{0.9775}O_3$. The calcined powder was ground in an agate mortar and then subjected to a crystallographic analysis by X-ray diffraction. The powder was revealed to be perovskite single phase. In addition, observation by a transmission electron microscope of the powder revealed that the average particle diameter was approximately 0.1 μm and the particles were uniform.

PbO powder was added to the above mentioned calcined powder in an amount sufficient to provide an 8% by weight amount of excess Pb component. The PbO powder and calcined powder were treated as in Example 1 to obtain the PLZT ceramics sintered body. The light transmittance of the obtained body was the same as in Example 1.

COMPARATIVE EXAMPLE 1 (Multi-stage Coprecipitation Method)

An aqueous solution containing 37.290 g of lead nitrate, 3.618 g of lanthanum nitrate, and 18.180 g of zirconium oxynitrate was prepared, to an amount of 300 cc. This aqueous solution was dropped, for 1 hour, into a one liter 6N-aqueous ammonia solution, while stirring. Precipitates of hydroxides of lead, lanthanum, zirconium were thus obtained in the suspension liquid. A preliminarily prepared aqueous solution containing 8.031 g of titanium tetrachloride was dropped, while stirring, into the suspension liquid, to obtain precipitates of hydroxide of lead, lanthanum, zirconium and titanium.

The suspension liquid was stirred for approximately 1 hour, and then the water rinsing and drying were carried out as in Example 1.

Calcination was then carried out at 700° C. for 3 hours to obtain a PLZT powder having the composition $(Pb_{0.91} La_{0.09})(Zr_{0.65} Ti_{0.35})_{0.9775}O_3$. The calcined powder was ground in an agate mortar and then subjected to a crystallographic analysis by X-ray diffraction. The powder was revealed to be composed of the requisite perovskite phase and a heterophase, which is an intermediate product caused by incomplete calcination. This heterophase did not disappear completely even after calcination at 800° C. for 3 hours. The requisite single phase of perovskite was obtained first by calcination at 900° C., but the powder calcined at 900° C. comprised coarse particles approximately 0.5 μm in average diameter. Thus, the sintering characteristics were inevitably lowered.

The calcined powders composed of a perovskite single phase obtained by the inventive Examples 1 and 2 and Comparative Example (multi-stage coprecipitation method) were subjected to an investigation of fluctuations in the composition thereof. As described above, the single phase of perovskite is attained at a calcining temperature as low as 700° C. in the inventive method, but by a calcining temperature of 900° C. or more in the comparative method. The investigated calcining temperature of comparative example is, therefore, 900° C. Twenty particles were extracted at random from each of the three kinds of calcined powders, and then according to the EDX (Energy Dispersion X-ray Spectroscopy) method, an electron beam approximately 200 Å in diameter was impinged upon each particle and the peak intensity of the characteristic X-ray was analyzed. The results are described with reference to FIG. 1. Although there is no great difference between the inventive method and comparative method with regard to the fluctuation in the Pb and La compositions of the A site, the fluctuation in Zr and Ti compositions of the B site according to the present invention is outstandingly smaller than that of the comparative example. This is because Zr and Ti are co-precipitated simultaneously according to the inventive method, but are precipitated in separate stages according to the comparative method, so that a fine and uniform mixing of the Zr and Ti components is difficult to attain. Accordingly, the inventive method, in which the co-precipitation operation is carried out separately for the respective sites, can easily realize a fine and uniform mixing of the constituent components of the respective sites, compared with the multi-stage coprecipitation method in which precipitation of one site is not carried out separately from the other site.

As described hereinabove, according to the present invention, there is provided a calcined powder of PLZT perovskite fine particles, which powder has an extremely uniform composition and can be easily sintered. Such a powder is appropriate for producing, by sintering, transparent ceramics having microscopically uniform optical properties. In addition, the production process of the present invention is simple, and the raw materials need not have a high purity, and therefore, inexpensive titanium tetrachloride can be used as the raw material. Also, the calcining temperature is low, and therefore, the transparent PLZT can be easily produced.

The present invention also covers the method for producing $Pb(Zr, Ti)O_3$ powder which is widely used in piezoelectric applications.

We claim:

1. A method for producing a PLZT powder comprising the steps of:
   preparing a first aqueous solution comprising lead based and lanthanum based components of PLZT, wherein the lead based and lanthanum based components are each independently selected from the group consisting of metals, sulfates, nitrates, oxynitrates, acetates, chlorides, oxychlorides and oxides;
   preparing a second aqueous solution comprising zirconium based and titanium based components of PLZT, wherein the zirconium based and titanium based components are each independantly selected from the group consisting of metals, sulfates, nitrates, oxynitrates, acetates, chlorides, oxychlorides and oxides;
   forming homogeneous precipitates from said first and said second aqueous solutions by:
   dropping the first and second aqueous solutions into a liquid body of a common precipitant, simultaneously and synchronously, while stirring the liquid body, and thus forming the homogeneous precipitates; and
   calcining the thus obtained homogeneous precipitates.

2. A process according to claim 1 consisting essentially of the steps recited.

3. A method according to claim 1, wherein the calcination is carried out at a temperature of 600° to 750° C., whereby a calcined powder is obtained having a perovskite single phase and compositional fluctuation with respect to PLZT expressed in the terms of percent based on the weight of PLZT, within a range of $PbO \pm 1.7\%$, $La_2O_3 \pm 0.7\%$, $ZrO_2 \pm 1.6\%$ and $TiO_2 \pm 0.7\%$.

4. A method according to claim 1, wherein the titanium based component is titanium tetrachloride.

5. A method according to claim 1, wherein said precipitant is selected from the group consisting of ammonia, ammonium carbonate, caustic alkali, sodium carbonate, amine and oxyne.

6. A method according to claim 1, wherein said precipitant is ammonia.

7. A method for producing a PLZT powder consisting essentially of the following steps:
   preparing a first aqueous solution comprising lead based and lanthanum based components of PLZT, wherein the lead based and lanthanum based components are each independantly selected from the group consisting of metals, sulfates, nitrates, oxynitrates, acetates, chlorides, oxychlorides and oxides;

preparing a second aqueous solution comprising zirconium based and titanium based components of PLZT, wherein the zirconium based and titanium based components are each independantly selected from the group consisting of metals, sulfates, nitrates, oxynitrates, acetates, chlorides, oxychlorides and oxides;

forming homogeneous precipitates from the first and second aqueous solutions by:

(a) dropping the first and second aqueous solutions into separate liquid bodies of precipitants, while stirring the liquid bodies of precipitants, and thus forming the first and second precipitates from the first and second aqueous solutions, respectively, and, (b) then, mixing the first and second precipitates as well as the liquid bodies of precipitant, whereby the homogeneous precipitates are obtained; and calcining the thus obtained homogeneous precipitates.

8. A method according to claim 7, wherein the calcination is carried out at a temperature of 600° to 750° C., whereby a calcined powder is obtained having a perovskite single phase and compositional fluctuation with respect to PLZT expressed in the terms of percent based on the weight of PLZT, within a range of $PbO \pm 1.7\%$, $La_2O_3 \pm 0.7\%$, $ZrO_2 \pm 1.6\%$ and $TiO_2 \pm 0.7\%$.

9. A method according to claim 7 wherein the titanium based component is titanium tetrachloride.

10. A method according to claim 7, wherein said precipitant is selected from the group consisting of ammonia, ammonium carbonate, caustic alkali, sodium carbonate, amine and oxyne.

11. A method according to claim 7 wherein said precipitant is ammonia.

12. A method for producing a PLZT ceramic consisting essentially of the following steps:

preparing a first aqueous solution comprising lead based and lanthanum based components of PLZT, wherein the lead based and lanthanum based components are each independently selected from the group consisting of metals, sulfates, nitrates, oxynitrates, acetates, chlorides, oxychlorides and oxides;

preparing a second aqueous solution comprising zirconium based and titanium based components of PLZT, wherein the zirconium based and titanium based components are each independantly selected from the group consisting of metals, sulfates, nitrates, oxynitrates, acetates, chlorides, oxychlorides and oxides;

forming homogeneous precipitates from the first and second aqueous solutions by:

(a) dropping the first and second aqueous solutions into separate liquid bodies of precipitants, while stirring the liquid bodies of precipitants, and thus forming the first and second precipitates from said first and second aqueous solutions, respectively, and, (b) then, mixing the first and second precipitates as well as the liquid bodies of precipitant, whereby the homogeneous precipitates are obtained;

calcining the thus obtained homogeneous precipitates to form a calcined powder;

forming a green body of said calcined powder; and sintering said green body to form a ceramic.

13. A method for producing a PLZT ceramic comprising the steps of:

(a) preparing a first aqueous solution comprising lead based and lanthanum based components of PLZT, wherein the lead based and lanthanum based components are each independantly selected from the group consisting of metals, sulfates, nitrates, oxynitrates, acetates, chlorides, oxychlorides and oxides;

(b) preparing a second aqueous solution comprising zirconium based and titanium based components of PLZT, wherein the zirconium based and titanium based components are each independantly selected from the group consisting of metals, sulfates, nitrats, oxynitrates, acetates, chlorides, oxychlorides and oxides;

(c) forming homogeneous precipitates from said first and said second aqueous solutions by dropping the first and second aqueous solutions into a liquid body of a common precipitant, simultaneously and synchronously, while stirring the liquid body, whereby the homogeneous precipitants are formed;

(d) calcining the thus obtained homogeneous precipitates to form a calcined powder;

(e) forming a green body of said calcined powder; and (f) sintering said green body to form a ceramic.

* * * * *